United States Patent
Letsch et al.

(10) Patent No.: US 10,249,452 B2
(45) Date of Patent: Apr. 2, 2019

(54) ARRANGEMENT WITH A HEAT-INSULATING SWITCH AND A HEAT INSULATION

(71) Applicant: Robert Bosch GmbH, Stuttgart (DE)

(72) Inventors: Andreas Letsch, Stuttgart (DE); Joerg Thielen, Stuttgart (DE); Martin Tenzer, Nuertingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 86 days.

(21) Appl. No.: 15/539,284

(22) PCT Filed: Jan. 12, 2016

(86) PCT No.: PCT/EP2016/050447
§ 371 (c)(1),
(2) Date: Jun. 23, 2017

(87) PCT Pub. No.: WO2016/120058
PCT Pub. Date: Aug. 4, 2016

(65) Prior Publication Data
US 2018/0005774 A1  Jan. 4, 2018

(30) Foreign Application Priority Data

Jan. 26, 2015 (DE) .......... 10 2015 201 289

(51) Int. Cl.
*H01H 9/54* (2006.01)
*H01M 2/34* (2006.01)
*H01M 10/658* (2014.01)

(52) U.S. Cl.
CPC .............. *H01H 9/54* (2013.01); *H01M 2/34* (2013.01); *H01M 10/658* (2015.04)

(58) Field of Classification Search
CPC ......... H01H 9/54; H01M 10/658; H01M 2/34
(Continued)

(56) References Cited

U.S. PATENT DOCUMENTS

2015/0137635 A1\* 5/2015 Firat ............... H02K 3/522
310/71

FOREIGN PATENT DOCUMENTS

DE  2936202 A1  3/1981
DE  10321132 A1  11/2004
(Continued)

OTHER PUBLICATIONS

International Search Report dated Mar. 29, 2016, of the corresponding International Application PCT/EP2016/050447 Filed Jan. 12, 2016.

*Primary Examiner* — Carlos D Amaya
(74) *Attorney, Agent, or Firm* — Norton Rose Fulbright US LLP; Gerard Messina

(57) ABSTRACT

An assemblage having a thermally insulating switch and a thermal insulator for constituting an electrical conductor passthrough through the thermal insulator. The thermal insulator insulates an inner space from an outer space, the assemblage having inner connector on the side of the inner space and outer connector on the side of the outer space, which are electrically conductively connectable by the switch. The assemblage has a control unit for controlling the thermally insulating switch, a current flowing through the switch is detectable by the control unit, the switch is controllable by the control unit in such a way that the switch is actuatable only in a substantially zero-current state, and the switch is disposed in the thermal insulator in such a way that thermal insulation between the inner connector and the outer connector is accomplished by way of the switch in the open state.

10 Claims, 4 Drawing Sheets

(58) Field of Classification Search
USPC .......................................................... 307/131
See application file for complete search history.

(56) References Cited

FOREIGN PATENT DOCUMENTS

| | | |
|---|---|---|
| FR | 1470674 A | 2/1967 |
| JP | 2002063947 A | 2/2002 |

* cited by examiner

ARRANGEMENT WITH A HEAT-INSULATING SWITCH AND A HEAT INSULATION

FIELD

The present invention relates to an assemblage having a thermally insulating switch and a thermal insulator for constituting an electrical conductor passthrough through the thermal insulator, in particular for electrical connection of a thermally insulated electrochemical battery to a load. The present invention further relates to a thermally insulated electrochemical battery and to a battery management system for controlling the thermally insulated battery, the thermally insulated battery having a thermally insulating switch for constituting a conductor passthrough through the thermal insulator.

BACKGROUND INFORMATION

Electrical leads having a low electrical resistance as a rule also exhibit low thermal resistance. When an electrical lead is passed through a thermal insulator, a thermally insulating substance having a low thermal conductivity is interrupted at least in single-point fashion by the electrical lead having a high thermal conductivity, so that a thermal bridge is produced. The larger the conductive cross section of the electrical lead, the greater the heat loss via a thermal bridge of this kind. The problem of undesired heat loss or heat exchange thus increases as the conductive cross section increases. In cases in which a large conductive cross section is necessary so that high electrical currents can be transported, a large heat loss can also be expected. As soon as a thermal difference exists between the sides of a thermal insulator, a thermal flux occurs and is reflected in a heat loss, regardless of whether an electrical current is flowing.

One example of such a situation is represented by the operation of a thermally insulated high-temperature battery. In batteries that are operated at temperatures above ambient temperature, such as LiS batteries having a polymer electrolyte, not only electrical energy but also energy in the form of heat flows out via the electrical lead. If the heat required for operation of the battery is generated by the battery itself, the energy required in order to compensate for the heat loss reduces the electrical energy that can be furnished to a load.

An energy loss of this kind cannot be avoided during usual discharge of the battery; if the conductive cross section is selected appropriately, the energy loss due to the heat flow is usually negligible as compared with the energy withdrawal by way of the electric current. If an electrical discharge is intermittently interrupted, however, as is the case e.g. in an electric vehicle, the energy loss due to the heat loss can result in a loss of several percent of battery capacity.

In order to reduce heat flows from electrical supply conductors in the region of an insulating sleeve of electrochemical units, German Patent Application No. DE 10321132A1 describes a disconnecting switch in the region of a passage through a heat absorber, by way of which the electrical connection can be interrupted and heat transport in the region of a supply conductor can be reduced.

SUMMARY

In accordance with the present invention, an assemblage is provided having a thermally insulating switch and a thermal insulator for constituting an electrical conductor passthrough through the thermal insulator, in particular for electrical connection of a thermally insulated electrochemical battery to a load, the thermal insulator thermally insulating an inner space from an outer space, the assemblage having inner connector means on the side of the inner space, the assemblage having outer connector means on the side of the outer space, and the switch in a closed state electrically conductively connecting the inner connector means to the outer connector means, and in an open state electrically disconnecting the inner connector means from the outer connector means, the assemblage having a control unit for controlling the thermally insulating switch, a current flowing through the switch being detectable by the control unit, the switch being controllable by the control unit in such a way that the switch is actuatable only in a substantially zero-current state, and the switch being disposed in the thermal insulator in such a way that thermal insulation between the inner connector means and the outer connector means is accomplished by way of the switch in the open state.

An assemblage of this kind may have the advantage that a thermal outflow via a conductor passthrough constituted by the assemblage is possible substantially only when the switch is closed. The switch can be opened at times when an electric current is not needed, so that the thermal outflow can also be substantially shut off. The assemblage furthermore offers the advantage that the switch, disposed in a thermal insulator, is not actuated under load, so that there is no occurrence of sparks or an electric arc that might cause the thermal insulation to ignite. As a further advantage, the contacts of the switch are protected from welding or erosion, and thus from rapid wear.

In an advantageous embodiment of the present invention, the inner connector means and/or outer connector means are at least partly recessed into the thermal insulator. This configuration offers the advantage that the switch can be disposed in such a way that it is disposed in a manner surrounded by the thermal insulator. Advantageously, the switch is disposed inside the thermal insulator in such a way that the thermal insulator is disposed in part between the switch and the inner space and/or outer space. This configuration offers the advantage that thermal bridging not only via the contacts of the switch, but also via the switch as a component or subassembly, is prevented. In other words, the switch, also constituting a component or subassembly, is advantageously disposed in the thermal insulator in such a way that it does not interrupt the thermal insulator at any point, but instead is entirely surrounded by it.

Also advantageously, the thermal insulator has an inner wall and an outer wall having a cavity disposed therebetween. This cavity is advantageously embodied as an open space. A configuration of this kind offers the advantage that the switch can be disposed in the cavity. The switch, for example constituting a self-contained component having a housing surrounding the switch, can thus be disposed completely between the inner and outer walls. This configuration offers the advantage that the switch can be disposed inside the thermal insulator with no need to weaken the thermal insulator, for example by reducing its wall thickness. The switch is disposed in such a way that thermal insulation is disposed both between the switch and the inner space and between the switch and the outer space. It is thus not possible for the switch itself to constitute a thermal bridge, for example due to a thermally conductive housing.

Advantageously, the inner connector means are passed through the inner wall, and/or the outer connector means are passed through the outer wall. A configuration of this kind allows weakening of the thermal insulator to be very greatly reduced. If the geometry of the thermal insulator is characterized by its surfaces facing respectively toward the inner and outer space and by its wall thickness, an interruption of the surfaces can therefore be limited to the cross-sectional area of the connector means.

Advantageously, a partial vacuum is formed in the cavity. Thanks to a partial vacuum or low-pressure vacuum, heat transfer due to thermal conduction between the inner and outer wall, and between the contacts of the switch in the opened state, is very largely suppressed.

The switch disposed in or inside the thermal insulator is controllable by a control unit. Such control by the control unit requires a transmission of control signals to the switch, this usually occurring via signal conductors. In order to minimize or avoid heat transport via signal conductors that also need to be passed through the thermal insulator, the control unit is advantageously disposed in a region outside the thermal insulator. Advantageously, the control unit is disposed in the outer space. Because the control unit as a rule has, in addition to a signal conductor for controlling the switch, further signal conductors e.g. to detect a request for closure of the switch or to detect a current flowing through the switch, disposing the control unit in the outer space allows the number of signal conductors to be introduced into the thermal insulator, and thus heat loss via signal conductors, to be minimized.

Advantageously, the energy required for actuation of the switch is deliverable by the control unit. Delivery via the control unit of the energy required for actuation of the switch, for example for activation of a switch in the form of a relay, allows the number of signal conductors and supply conductors to be minimized.

Also advantageously, the switch may be configured in multiple-pole fashion. Several single-pole conductor passthroughs, or at least one multiple-pole conductor passthrough, are necessary in order to constitute a closed circuit. The switch is preferably constructed in double-pole fashion, for example in order to close a high-current circuit. In an advantageous embodiment, the switch is of trapezoidal or conical construction and has switching contacts that are disposed along the cone or trapezoid. A trapezoidal or conical construction of a switch, in which two contact surfaces are disposed opposite one another on an outer cone and in which a bridge contact is disposed on an inner cone in such a way that upon introduction of the inner cone into the outer cone, the contacts of the outer cone are electrically connectable by way of the bridge contact, permits cascading of several poles, even those embodied with a large area, along the rotation axis of the cone. An embodiment of this kind has the advantage that upon a translational movement of the inner cone along the rotation axis, a cavity whose width is modifiable occurs between the inner and outer cone, and ensures not only electrical but also thermal insulation. This is correspondingly the case for a trapezoidal configuration.

Advantageously, the switch furthermore may have an effector and an actuator that are connected to one another via a plunger. A configuration of this kind permits additional thermal insulation between the effector and actuator, for example by the fact that the plunger is of thermally insulating configuration.

In the case of a switch of trapezoidal or conical configuration, for example, a solenoid acting as an actuator can be thermally insulated, via a plunger embodied in thermally insulating fashion, from an inner cone that is connected to the plunger and acts as an effector.

Alternatively, for example, the switch may have an electromagnetically triggerable tilting mechanism or a disc rotatable by way of a drive system, in which as a result of a rotation of the disc, contacts disposed, for example, on its periphery are electrically connectable via a bridge disposed on the disc.

Also provided according to the present invention is a thermally insulated electrochemical battery and a battery management system for controlling the thermally insulated battery, the thermally insulated battery having an assemblage having a thermally insulating switch and a thermal insulator for constituting an electrical conductor passthrough through the thermal insulator for electrical connection of the battery to a load, the thermally insulated battery having an energy reservoir that is disposed inside the inner space surrounded by the thermal insulator, the energy reservoir being connected in the inner space to the inner connecting means, the thermally insulated battery being chargeable and/or dischargeable via the outer connecting means in a closed state of the switch, and the function of the control unit being executable by the battery management system. The battery management system is preferably configured in such a way that the switch is actuated only in a substantially zero-current state.

A battery of this kind, which can be embodied, for example, as LiS batteries having a polymer electrolyte and in particular as a vehicle battery, has the advantage that in an inactive mode in which it is not being discharged with any, or substantially any, current, it also loses substantially no heat via the conductor passthroughs through the thermal insulator. As a result, in the context of utilization in an electric vehicle, up to several percent of battery capacity, which would need to be expended in order to compensate for the heat loss, can be conserved every day. In addition, control of the switch can advantageously be effected via the battery management system. In addition, means for current detection, which are usually available to a battery management system, can advantageously be used in addition to their usual purpose in order to control the actuation of the switch in such a way that actuation thereof occurs only in the substantially zero-current state, so that ignition of the thermal insulator due to sparking can be ruled out. The result is that, advantageously, not only is welding or erosion of the contacts avoided, but ignition of the thermal insulator surrounding the switch is prevented and a fire risk is thus eliminated.

The present invention is explained in further detail below on the basis of preferred exemplifying embodiments.

DETAILED DESCRIPTION OF EXAMPLE EMBODIMENTS

Figure 1:
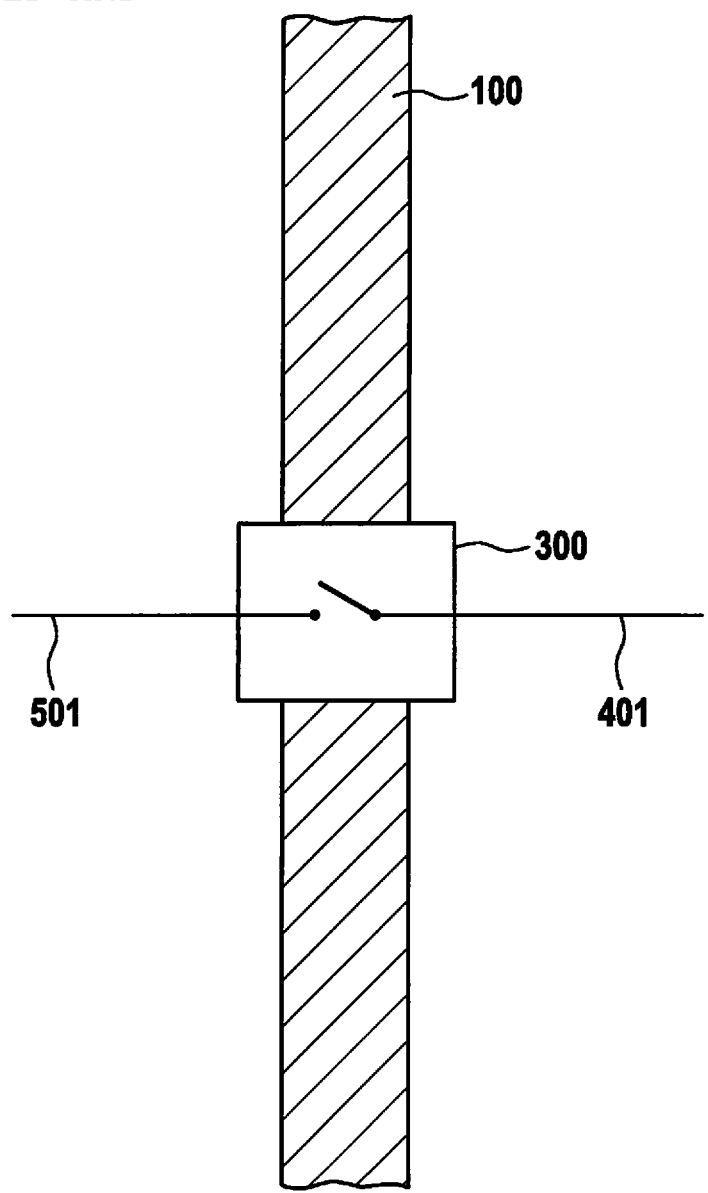
FIG. 1 shows an assemblage having a switch in a thermal insulator, according to the existing art.

FIG. 1 shows, as existing art, a switch 300, embodied as a disconnecting switch, on electrical supply conductors or connector means 401, 501 of thermally insulated electrochemical units, switch 300 disconnecting electrical supply conductors or connector means 401, 501 in the region of the passage of supply conductors or connector means 401, 501 through thermal insulator 100, and, in addition to interrupting the electrical connection, also considerably reducing heat flows via the electrical supply conductor.

Figure 2:
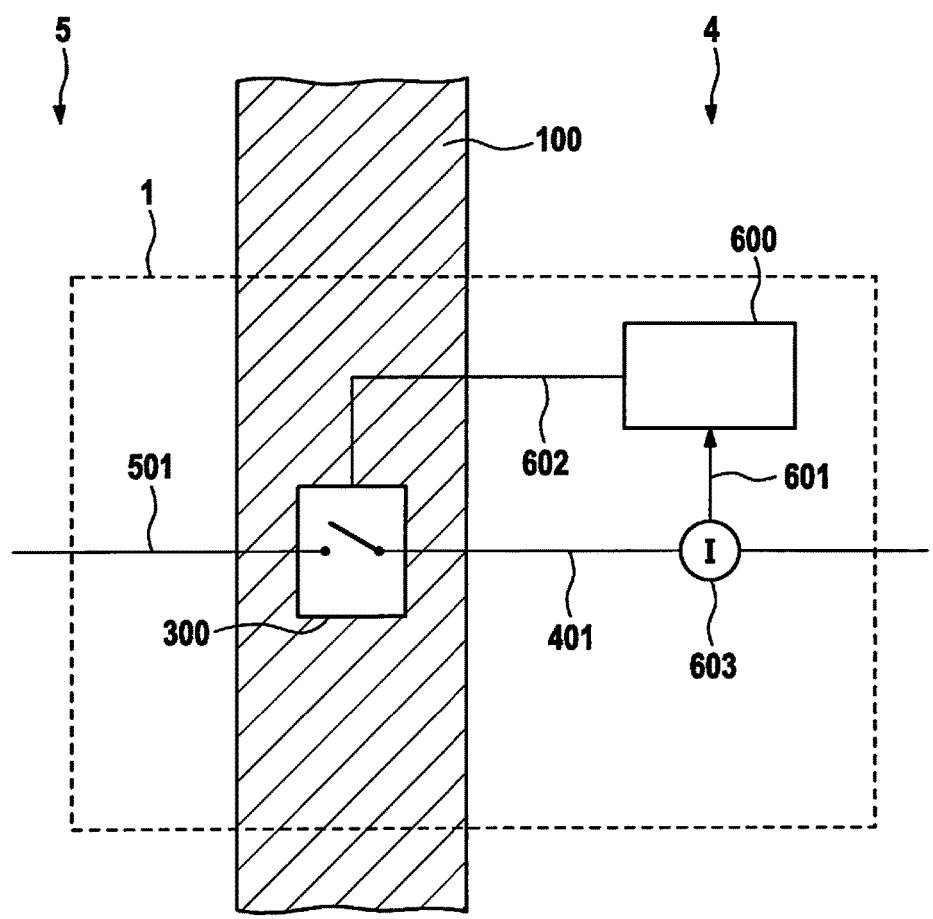
FIG. 2 shows a first exemplifying embodiment of an assemblage according to the present invention having a thermally insulating switch inside a thermal insulator, and having a control unit for actuating the switch.

FIG. 2 shows a first exemplifying embodiment of an assemblage 1 according to the present invention having a thermally insulating switch 300 inside a thermal insulator 100, and having a control unit 600 for actuating switch 300. Assemblage 1 shown in FIG. 2 serves to constitute an electrical conductor passthrough through thermal insulator 100, as necessary, e.g., for electrical connection of a thermally insulated electrochemical battery to a load. Thermal insulator 100 insulates an inner space 5 from an outer space 4. Assemblage 1 has inner connector means 501 on the side of inner space 5, and outer connector means 401 on the side of outer space 4. In a closed state, switch 300 connects inner connector means 501 to outer connector means 401 in electrically conductive fashion; with switch 300 in an open state, inner connector means 501 are electrically disconnected from outer connector means 401.

Assemblage 1 has a control unit 600 for controlling thermally insulating switch 300 via a first signal conductor 602, a current flowing through switch 300 being detectable by control unit 600 via a measuring means 603 and a second signal conductor 601. Switch 300 is controllable by control unit 600, via first signal conductor 602, in such a way that switch 300 is actuatable only in a substantially zero-current state. Switch 300 is furthermore disposed in thermal insulator 100 in such a way that thermal insulation between inner connector means 501 and outer connector means 401 is effected via switch 300 in the open state.

Inner connector means 501 and outer connector means 401 are also at least partly recessed into thermal insulator 100, 200. Switch 300 is disposed inside thermal insulator 100 in such a way that thermal insulator 100 is disposed between switch 300 and inner space 5, and between switch 300 and outer space 4. Switch 300 is thereby completely surrounded by thermal insulator 100, so that a thermal bridge is also not constituted by the housing of switch 300 or by switch 300 as a unit.

Figure 3:
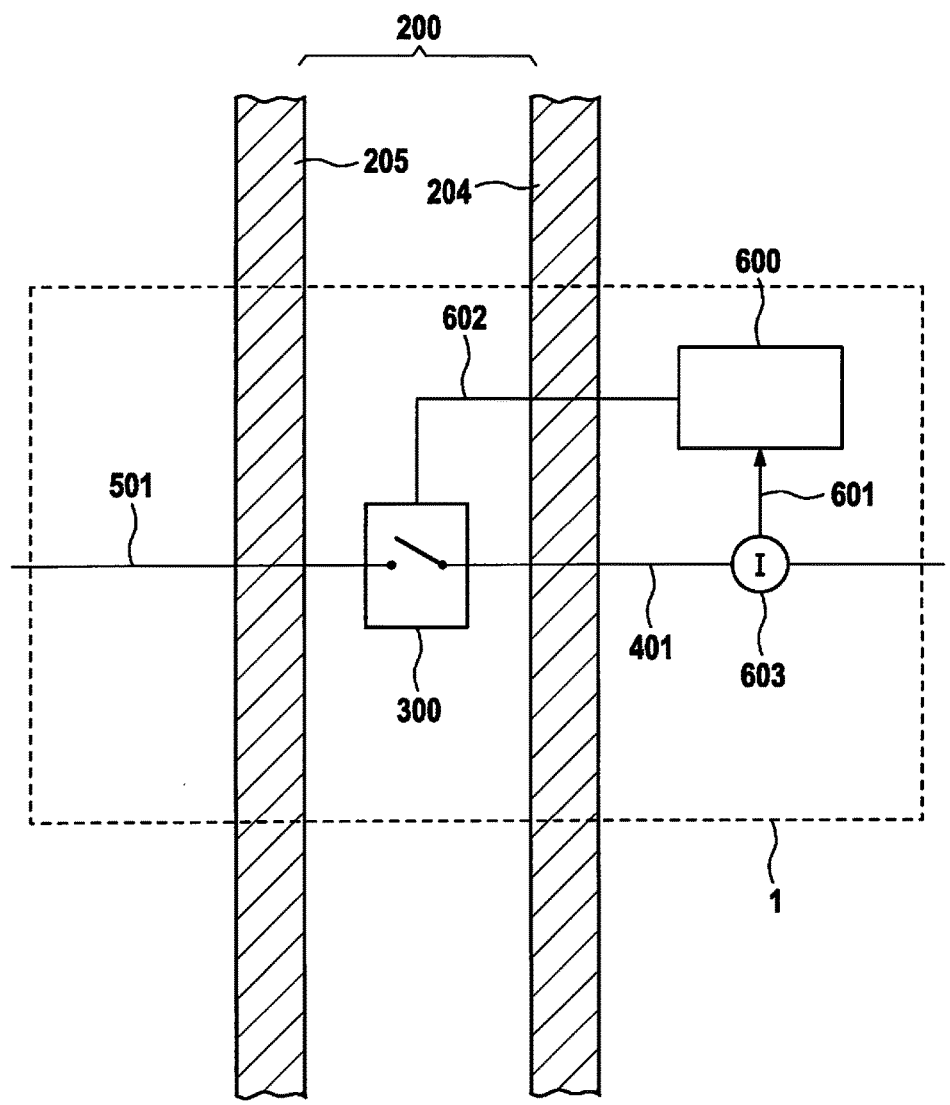
FIG. 3 shows a second exemplifying embodiment of an assemblage according to the present invention, in which the thermal insulator is embodied with an inner and an outer wall.

FIG. 3 shows a second exemplifying embodiment of an assemblage 1 according to the present invention. The exemplifying embodiment shown in FIG. 3 corresponds substantially to the exemplifying embodiment described previously and shown in FIG. 2. In contrast to the previous exemplifying embodiment, in this exemplifying embodiment thermal insulator 200 has an inner wall 205 and an outer wall 204 having a cavity disposed therebetween. Inner connector means 501 are passed through inner wall 205, and outer connector means 401 are passed through outer wall 204. The cavity between inner wall 205 and outer wall 204 is embodied as an open space, i.e. with no insulating material. Switch 300 is disposed in that cavity, which otherwise, aside from connector means 501, 401 and signal conductor 602, exhibits a partial vacuum in order to improve thermal insulation.

Control unit 600 is disposed in outer space 4 in a region outside thermal insulator 200. The energy required for actuation of switch 300 is deliverable to switch 300 by control unit 600 via first signal conductor 602.

Figure 4:
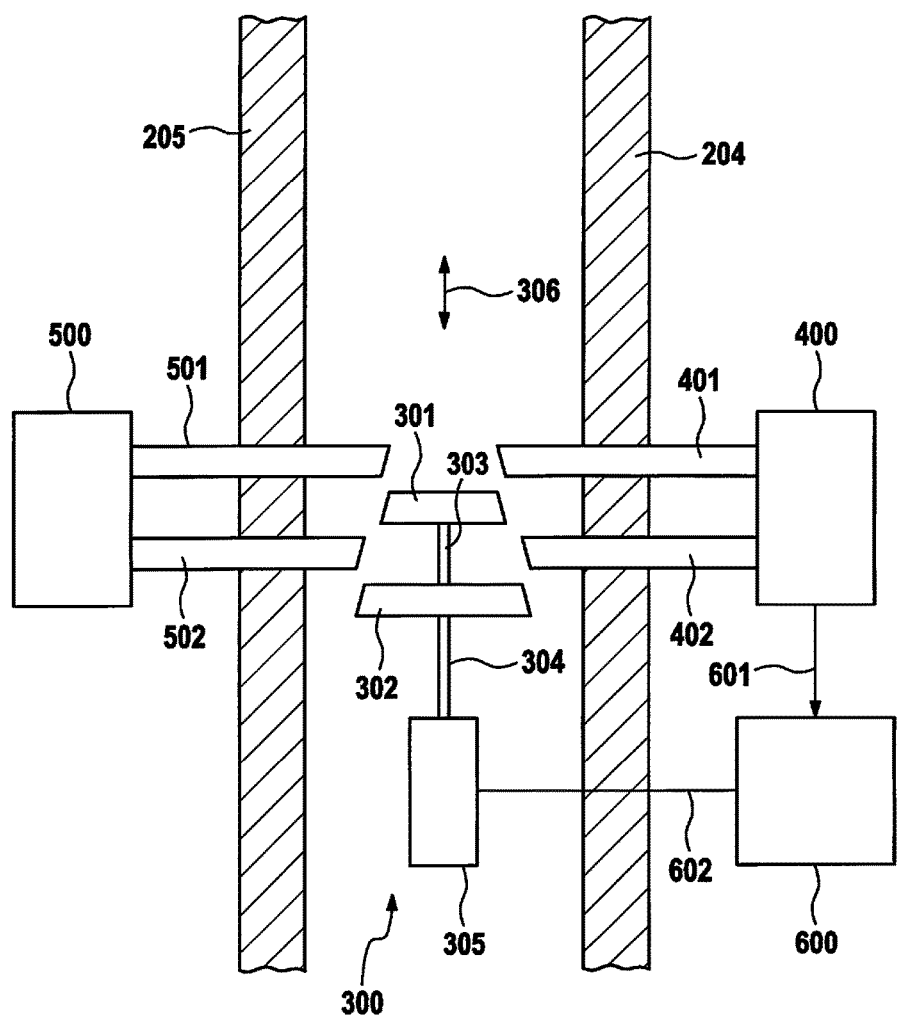
FIG. 4 shows a third exemplifying embodiment of an assemblage according to the present invention, in which the thermal insulator is embodied with an inner and an outer wall, the switch is disposed between the walls, and the switch has a conical configuration.

FIG. 4 shows a third exemplifying embodiment of an assemblage 1 according to the present invention, in which thermal insulator 200 is embodied with an inner wall 205 and outer wall 204, switch 300 is disposed between walls 204, 205, and switch 300 has a conical configuration. Aside from the configuration of switch 300, the exemplifying embodiment shown in FIG. 4 corresponds substantially to the exemplifying embodiment described above and shown in FIG. 3. In addition to the configuration of switch 300, FIG. 4 differs from FIG. 3 in that the measuring means for detecting a current flowing through switch 300 are embodied integrally with outer connector means 400, 401, 402. Inner connector means 500, 501, 502 and outer connector means 400, 401, 402 are each embodied for two poles.

Switch 300 shown in FIG. 4 is of conical configuration and has switching contacts that are disposed along the cone. The conically configured switch 300 is of double-pole configuration and permits inner connector means 501, 502 to be connected to outer connector means 401, 402, and allows them to be disconnected from one another, in such a way that thermal insulation is ensured.

Inner connector means 501, 502 and outer connector means 401, 402 have for that purpose, on their respective ends, planar contacts that are disposed, in accordance with their shape, opposite one another on an outer cone. Two bridge contacts 301 and 302 are disposed on an inner cone in such a way that upon introduction of the inner cone into the outer cone, the contacts of the outer cone are electrically connectable by way of bridge contacts 301 and 302. The contacts are embodied in planar fashion, so that upon closure of switch 300, large contact surfaces are produced for substantially loss-free passage of high currents.

Placement of the contacts along the rotation axis of a cone allows both cascading and the constitution of planar contacts.

Upon a translational movement 306 of the inner cone along the rotation axis, a cavity of variable width is produced between the inner and outer cone and ensures not only electrical but also thermal insulation.

Switch 300 has an effector in the form of bridge contacts 301, 302 and an actuator in the form of a solenoid 305, which are connected to one another via a plunger 303, 304.

What is claimed is:

1. An assemblage, comprising:
   a thermally insulating switch and a thermal insulator for constituting an electrical conductor passthrough through the thermal insulator for electrical connection of a thermally insulated electrochemical battery to a load, the thermal insulator thermally insulating an inner space from an outer space the assemblage having inner connector on a side of the inner space, the assemblage having outer connector on a side of the outer space, and the switch, in a closed state electrically conductively connecting the inner connector to the outer connector, and in an open state electrically disconnecting the inner connector from the outer connector; and
   a control unit to control the thermally insulating switch, a current flowing through the switch being detectable by the control unit, the switch being controllable by the control unit in such a way that the switch is actuatable only in a substantially zero-current state;
   wherein the switch is disposed in the thermal insulator in such a way that thermal insulation between the inner connector and the outer connector is accomplished by way of the switch in the open state.

2. The assemblage as recited in claim 1, wherein at least one of the inner connector and the outer connector are at least partly recessed into the thermal insulator.

3. The assemblage as recited in claim 1, wherein the switch is disposed inside the thermal insulator in such a way that the thermal insulator is disposed in part between the switch and at least one of the inner space and the outer space.

4. The assemblage as recited in claim 1, wherein the thermal insulator has an inner wall and an outer wall having a cavity disposed therebetween.

5. The assemblage as recited in claim 4, wherein at least one of: (i) the inner connector is passed through the inner wall, and (ii) the outer connector is passed through the outer wall.

6. The assemblage as recited in claim 4, wherein the switch is disposed in the cavity.

7. The assemblage as recited in claim 4, wherein a partial vacuum is in the cavity.

8. The assemblage as recited in claim 1, wherein the switch is of multiple-pole configuration.

9. The assemblage as recited in claim 1, wherein the switch is one of a trapezoidal or a conical construction, and has switching contacts that are disposed along the cone.

10. A thermally insulated electrochemical battery and a battery management system for controlling the thermally insulated battery, the thermally insulated battery having an assemblage having a thermally insulating switch and a thermal insulator for constituting an electrical conductor passthrough through the thermal insulator for electrical connection of the battery to a load, the thermal insulator thermally insulating an inner space from an outer space the assemblage having inner connector on a side of the inner space, the assemblage having outer connector on a side of the outer space, and the switch, in a closed state electrically conductively connecting the inner connector to the outer connector, and in an open state electrically disconnecting the inner connector from the outer connector, and a control unit to control the thermally insulating switch, a current flowing through the switch being detectable by the control unit, the switch being controllable by the control unit in such a way that the switch is actuatable only in a substantially zero-current state, wherein the switch is disposed in the thermal insulator in such a way that thermal insulation between the inner connector and the outer connector is accomplished by way of the switch in the open state;

wherein the thermally insulated battery has an energy reservoir that is disposed inside the inner space surrounded by the thermal insulator, the energy reservoir being connected in the inner space to the inner connector, the thermally insulated battery being at least one of chargeable and dischargeable via the outer connector in a closed state of the switch, and the function of the control unit being executable by the battery management system.

\* \* \* \* \*